United States Patent Office 3,464,627
Patented Sept. 2, 1969

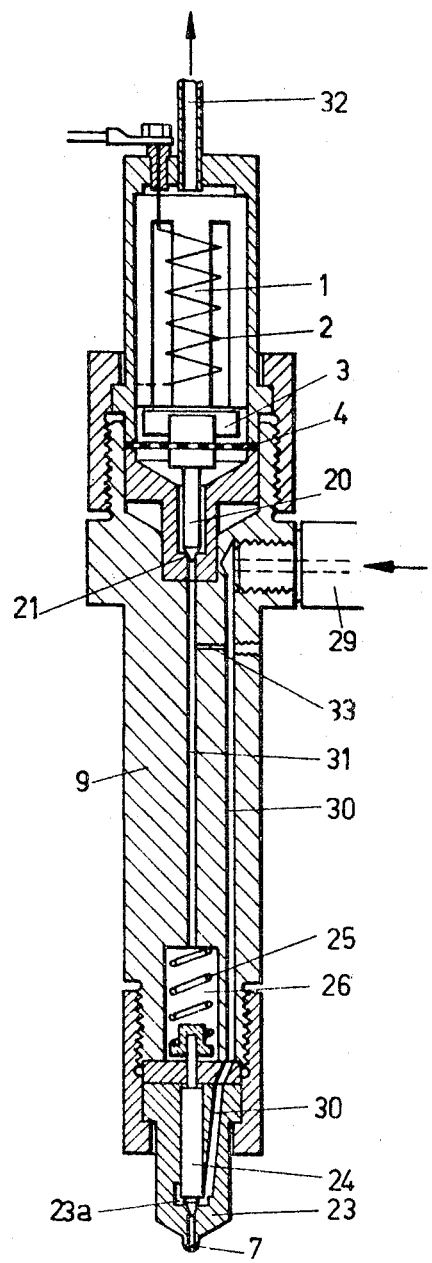

3,464,627
ELECTROMAGNETIC FUEL-INJECTION VALVE
Robert Huber, Zumikon, Switzerland, assignor to Societe des Procede Modernes d'Injection Sopromi, Seto, France
Filed June 12, 1967, Ser. No. 645,170
Claims priority, application Switzerland, June 21, 1966, 8,956/66
Int. Cl. F02m *41/16;* B05b *1/30;* F16k *31/12*
U.S. Cl. 239—96                                    4 Claims

ABSTRACT OF THE DISCLOSURE

A fuel-injection valve in which fuel pressure is utilized to hydraulically control the valve so that relatively high fuel pressures can be controlled with a small electromagnetic valve member. A first fluid conduit conducts fuel between a fuel inlet and a fuel outlet, and a hydraulically movable valve member controls the flow of fuel out of the fuel outlet. A second fluid conduit communicates between the fuel inlet and one end of the hydraulically movable valve member to apply a hydraulic pressure thereto, and a third fluid conduit communicates between the same end of the hydraulically movable valve member and a second fuel outlet. A relatively small electromagnetically movable valve member controls the flow of fuel out of the second fuel outlet, thereby controlling the hydraulic pressure applied to the hydraulically movable valve member, and thus controlling the flow of fuel out of the first fuel outlet.

BACKGROUND OF THE INVENTION

The present invention relates to an electromagnetic fuel-injection valve for internal-combustion engines, particularly for diesel engines. Electromagnetically operated fuel-injection valves are known, but in the past they were mainly used in Otto carburetor engines in which the fuel is injected into the suction line. The use of electromagnetic valves for diesel engines is complicated by two factors. First, because of the substantially higher compression, the required fuel pressure in diesel engine valves is also significantly higher and thus requires greater electromagnetic forces and consequently larger dimensions for the electromagnets. Furthermore, the space available for the installation of such valves in the cylinder head of a diesel engine is rather limited.

SUMMARY OF THE INVENTION

The object of this invention is to make possible the use of electromagnetically operated injection valves in diesel engines. In accordance with this invention, this is accomplished by providing a valve which is controlled by an electromagnetic valve as well as by a hydraulically controlled valve, the latter valve controlling the fuel supply to the atomizer nozzle, and being operated by means of a decrease in pressure in a hydraulic chamber whose pressure is controlled by the electromagnetic valve.

BRIEF DESCRIPTION OF THE DRAWINGS

The sole figure is an axial section of one illustrative embodiment of the invention.

DESCRIPTION OF THE PREFERRED EMBODIMENT

In the illustrated embodiment, the electromagnetic valve has a fixed armature 1 with a winding 2. The movable portion of the electromagnetic valve consists of an iron mass 3, a diaphragm spring 4, and a needle valve 20 cooperating with a valve seat 21. The latter is connected via a bore 31 to a hydraulic chamber 26 disposed in a nozzle holder 9. A nozzle 23 containing atomizer openings 7 is attached to the nozzle holder 9 by screw threads. An axially displaceable needle valve 24, which is held on its seat by a spring 25, is disposed in the nozzle 23.

The fuel is brought directly into the chamber 23a inside nozzle 23 by means of a high-pressure fuel pump of 500–1000 atmospheres (not shown) through a lateral fuel inlet 29 and through a bore 30 provided in the nozzle holder. A transverse bore 33 of small cross section connects the bore 30 with the bore 31, the latter being connected, via the electromagnetic valve and through the perforated diaphragm spring 4 and the armature area to a fuel outlet line 32, which is returned to the fuel pump. When the electromagnetic valve is closed, the full fuel pump pressure is present in the bore 31 and in the hydraulic chamber 26, which pressure cooperates with spring 25 to hold the needle valve 24 against its seat.

Upon initiation of the injection action, the winding 2 is energized by a distributor circuit or the like, which is not shown in the drawings. Thus the needle valve 20 is lifted off its seat 21 and the exiting fuel causes a decrease in pressure in the bore 31 and in hydraulic chamber 26. The needle valve 24 is thus lifted against the pressure of spring 25 due to the difference in pressure between chambers 23a and 26 and remains open until the valve 20, 21 closes again and the pressure in line 31 increases again. The opening time for the metering valve 20, 21 depends on the duration of excitation of winding 2, which is controlled in a known manner by the distributor circuit and depends on the operational state of the engine. In this way, it is possible to control high fuel pressures with relatively small electromagnetic forces.

I claim:
1. An electromagnetic fuel-injection valve for internal combustion engines, comprising, in combination:
 (a) a valve housing having a fuel inlet and first and second fuel outlets;
 (b) a first fluid conduit within said valve housing communicating between said fuel inlet and said first fuel outlet;
 (c) a hydraulically movable valve member within said valve housing for controlling the flow of fuel said first fuel outlet, one end of said hydraulically movable valve member being within said first fluid conduit and the other end thereof being a hydraulic chamber in said valve housing;
 (d) a spring within said hydraulic chamber urging said hydraulically movable valve member toward its closed position;
 (e) a second fluid conduit within said valve housing communicating between said fuel inlet and said hydraulic chamber;
 (f) a third fluid conduit within said valve housing communicating between said hydraulic chamber and said second fuel outlet; and
 (g) an electromagnetically movable valve member within said valve housing including a fixed armature with a winding thereon, a spring member adjacent to said fixed armature, a mass of ferromagnetic material attached to said spring member, and a valve member attached to said mass of ferromagnetic material, for controlling the flow of fuel from said second fuel outlet, thereby controlling the pressure within said hydraulic chamber, and thus controlling the position of said hydraulically movable valve member to control the flow of fuel from said first fuel outlet.

2. An electromagnetic fuel-injection valve as defined in claim 1 wherein said spring member is a perforated diaphragm spring and is positioned in said third fluid conduit between said hydraulic chamber and said control fuel outlet.

3. An electromagnetic fuel-injection valve as defined in claim 2 wherein said fixed armature is positioned in said third fluid conduit between said perforated diaphragm spring and said second fuel outlet.

4. An electromagnetic fuel-injection valve as defined in claim 3 wherein said hydraulic chamber, said hydraulically movable valve member, said third fluid conduit, said electromagnetically movable valve member, and said first and second fuel outlets are coaxial with each other, said first fuel outlet being positioned on one end of said housing member and said second fuel outlet being positioned on the axially opposed end of the housing.

References Cited

UNITED STATES PATENTS

| 1,701,089 | 2/1929 | Von Salis | 239—96 X |
| 1,954,804 | 4/1934 | Doble | 251—30 X |
| 1,999,221 | 4/1935 | Walker et al. | 239—585 X |
| 2,881,980 | 4/1959 | Beck et al. | 239—585 X |
| 3,241,768 | 3/1966 | Croft | 239—585 X |

M. HENSON WOOD, JR., Primary Examiner

M. Y. MAR, Assistant Examiner

U.S. Cl. X.R.

123—139; 239—533, 585; 251—30